United States Patent Office 3,123,604
Patented Mar. 3, 1964

---

3,123,604
HYDROXY POLYAMINES
Edgar R. Rogier, Hopkins, Minn., assignor to General Mills, Inc., a corporation of Delaware
No Drawing. Filed Nov. 16, 1959, Ser. No. 852,937
19 Claims. (Cl. 260—247.5)

The present invention relates to the novel hydroxyl containing polyamines and their derivatives.

The compounds of the present invention are novel compositions which may be used for a large number of purposes, such as curing agents for polyepoxy resins, corrosion inhibitors, sludge inhibiting fuel oil additives and of course as chemical intermediates.

The compounds of the present invention are those novel hydroxyl containing polyamines which have the formula $RCH_2NH_2$ in which R is an aliphatic hydrocarbon group containing 16-22 carbon atoms and has attached to each carbon atom of at least one pair of adjacent carbon atoms different groups selected from the class consisting of OH and

where $R_1$ and $R_2$ are members selected from the class consisting of (1) hydrogen, (2) aliphatic groups, (3) aryl groups, (4) hydroxyalkyl groups, and (5) where

is part of a heterocyclic group such as

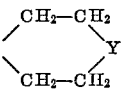

where Y=O, N or S.

The compounds of the present invention may be prepared by hydrogenation of the corresponding amino hydroxy nitriles which in turn may be obtained by the reaction of an epoxy higher alkyl nitrile with ammonia or a primary or secondary amine to introduce a hydroxyl group on one of the epoxy carbon atoms and an amino group on the other.

The epoxy higher alkyl nitriles which are to be used in preparing the amino hydroxy stearonitriles are those epoxy nitriles which may conveniently be obtained by the reaction of perbenzoic or peracetic acid with an unsaturated fatty nitrile.

Those unsaturated fatty nitriles prepared by the reaction of ammonia and an unsaturated fatty acid, such as oleic, erucic, eleostearic, linoleic, linolenic, clupanodonic, palmitoleic and palmitolenic acid, form convenient starting materials for preparing epoxy nitriles which contain an even number of carbon atoms. Whereas those unsaturated fatty nitriles which are prepared by the reaction of an unsaturated alkyl halide and an inorganic cyanide form convenient starting materials for preparing epoxy nitriles which contain an odd number of carbon atoms.

The unsaturated fatty acids previously referred to occur naturally in animal and vegetable fats and oils such as soybean, safflower, cottonseed, rapeseed, linseed and sardine oils and the like. Whereas the previously mentioned unsaturated alkyl halides may be prepared by converting one of the aforementioned fatty acids to an alcohol and reacting that alcohol with a halogen acid to form the alkyl halide.

It will be readily apparent to those skilled in the art that a large number of amino hydroxynitriles may be prepared by reacting one of the previously described epoxy nitriles with ammonia or a primary or secondary amine. Such compounds as ethylene diamine, diethylene triamine, or other polyamines, morpholines, ethanolamine, diethanolamine, amino phenols, substituted and unsubstituted alkyl and aryl amines are only representative of the many varieties of amine reactants which may be used to split the epoxy group to form the amino hydroxy nitriles which will upon hydrogenation yield the compounds of the present invention.

The epoxy ring may be split on either side of the oxygen bond so that the hydroxyl group or amino group may be attached to either of the carbon atoms of the original epoxy group. Accordingly the reaction product may contain both isomeric forms of the compounds as illustrated by the following formulas which represent the compounds obtained when 9,10-epoxystearonitrile is reacted with ammonia.

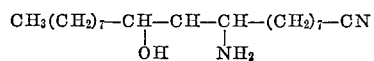

and

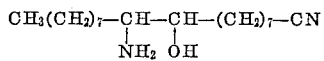

Upon hydrogenation the —CN group of each of the isomeric nitriles is converted to a —$CH_2NH_2$ group so that the hydrogenation mixture contains both 9-amino-10-hydroxystearylamine and its isomer 10-amino-9-hydroxystearylamine.

While the exact conditions for hydrogenation may vary for the compounds falling within the scope of the present invention, it can generally be said that the hydrogenation of the hydroxy amino higher alkyl nitrile proceeds satisfactorily in the presence of Raney nickel and hydrogen at moderate temperatures (130–150° C.) and pressure (400–800 p.s.i.g.).

The present invention is further illustrated by reference to the following examples.

EXAMPLE I

9(10)-Amino-10(9)-Hydroxystearonitrile

An autoclave was charged with 250 g. of 9,10-epoxystearonitrile (4.7% oxirane oxygen), 125 g. of methanol and 166 g. of anhydrous ammonia. The reaction mixture was then agitated and heated at 130–135° C. for 9 hours at 750 p.s.i.g. pressure. After passing the crude reaction product through a sulfonic acid ion exchange resin in the acid form and vacuum distillation at 2 mm. Hg a yield of 163 grams of 9(10)-amino-10(9)-hydroxystearonitrile was obtained which had an amine number of 186 (theoretical amine number for $C_{18}H_{36}ON_2$ is 189).

9(10)-Amino-10(9)-Hydroxystearylamine

Into a 1 liter autoclave was charged 150 g. of the above-described 9(10)-amino-10(9)-hydroxystearonitrile, 100 ml. of methanol, 5 g. of Raney nickel and 14 g. of ammonia. The mixture was agitated at 145° C. with 750 p.s.i. pressure of hydrogen for 3 hours. The catalyst was then removed by filtration and the solvent evaporated in vacuo. Distillation of the crude reaction product yielded 97 g. of 9(10)-amino-10(9)-hydroxystearylamine which had a boiling point of 175–186° C. and an amine number of 380 (calculated amine number for $C_{18}H_{40}ON_2$ is 373).

EXAMPLE II

9(10)-Dimethylamino-10(9)-Hydroxystearonitrile

An autoclave was charged with 100 g. of dimethyl amine and 202 g. of 9,10-epoxystearonitrile (4.7% oxirane oxygen). The reaction mixture was then agitated and heated at 140–150° C. for 17.5 hours at 750 p.s.i.g. pressure. After passing the crude reaction mixture through a sulfonic acid ion exchange resin in the acid form and vacuum distillating as in Example I, a 95% yield was based on the weight yield of amine fraction and oxirane content of the 9,10-epoxystearonitrile of 9(10)-dimethylamino-10(9)-hydroxystearonitrile was obtained which had an amine number of 169 (calculated amine number for $C_{20}H_{40}ON_2$ is 173).

9(10)-Dimethylamino-10(9)-Hydroxystearylamine 87 grams of the above prepared 9(10)-dimethylamino-10(9)-hydroxystearonitrile was charged into an autoclave with 200 g. of methanol, 6 g. of Raney nickel and 16 g. of $NH_3$. The mixture was then hydrogenated at 140–150° C. with 450–480 p.s.i. of hydrogen for 1 hour. The catalyst and solvent were then removed as previously described, and the crude product was distilled to yield 9(10) - dimethylamino - 10(9) - hydroxystearylamine with an amine number of 341 (calculated amine number for $C_{20}H_{44}ON_2$ is 341).

EXAMPLE III

9(10)-Dodecylamino-10(9)-Hydroxystearonitrile

Into a flask containing 691 g. of 9,10-epoxystearonitrile (4.65% oxirane oxygen) was added 740 g. of n-dodecylamine (amine number 303) and 124 g. of ethylene glycol. The mixture was reacted for 8.8 hours at 150° C. After passing the crude reaction through a sulfonic acid ion exchange resin in the acid form and subsequent vacuum distillation as described in Example I, a 92% yield as based on the weight yield of amine fraction and oxirane content of the 9,10-epoxystearonitrile of 9(10)-dodecylamino-10(9)-hydroxystearonitrile was obtained which had an amine number of 120 (calculated amine number for $C_{30}H_{60}ON_2$ is 121).

9(10)-Dodecylamino-10(9)-Hydroxystearylamine 398 g. of the above prepared 9(10)-dodecylamino-10(9)-hydroxystearonitrile was charged into an autoclave with 30 ml. of methanol, 19 g. of ammonia and 16 g. of Raney nickel. The mixture was agitated at 145° C. with 950 p.s.i. of hydrogen for 3.5 hours. The catalyst and solvent were removed as previously described and the crude product vacuum distilled to yield 9(10)-dodecylamino-10(9)-hydroxystearoamine with an amine number of 239 (calculated amine number for $C_{30}H_{64}ON_2$ is 239).

EXAMPLE IV

9(10)-Anilino-10(9)-Hydroxystearonitrile

Into a flask containing 800 g. of 9,10-epoxystearonitrile (4.65% oxirane oxygen) was added 1080 g. of aniline and 140 g. of ethylene glycol. The mixture was agitated for 14.5 hours at 150° C. After passing the crude reaction product through a sulfonic acid ion exchange resin in the acid form and subsequent vacuum distillation as described in Example I an 87% yield as based on the weight yield of amine fraction and oxirane content of 9,10-epoxystearonitrile was obtained of 9(10)-anilino-10(9)-hydroxystearonitrile which had an amine number of 148 (calculated amine number for $C_{24}H_{40}ON_2$ is 151).

9(10)-Anilino-10(9)-Hydroxystearylamine 200 g. of the above prepared 9(10)-anilino-10(9)-hydroxystearonitrile was charged into an autoclave with 200 g. of methanol, 33 g. of ammonia and 8 g. of Raney nickel. The mixture was then agitated at 130° C. with a pressure of 470 p.s.i. of hydrogen for 2.5 hours. The catalyst and solvent were removed as previously described and the crude product vacuum distilled to yield 9(10)-anilino-10(9)-hydroxystearlyamine with an amine number of 298 (calculated amine number for $C_{24}H_{44}ON_2$ is 298).

EXAMPLE V

9(10)-Morpholino-10(9)-Hydroxystearonitrile

To 1054 g. of 9,10-epoxystearonitrile (4.65% oxirane oxygen) in a flask was added 530 g. of morpholine and 186 g. of ethylene glycol. The mixture was then reacted for 12 hours at 150° C.

A 95% yield based on weight yield of amine fraction and oxirane content of crude 9,10-epoxystearonitrile of 9(10) - morpholino - 10(9) - hydroxystearonitrile was obtained which after being purified as described in Example I had an amine number of 155 (calculated amine number for $C_{22}H_{42}O_2N_2$ is 153).

9(10)-Morpholino-9(10)-Hydroxystearylamine 404 g. of the above prepared 9(10)-morpholino-10(9)-hydroxystearonitrile was charged into an autoclave with 20 ml. of methanol, 17 g. of ammonia and 12 g. of Raney nickel. The mixture was then agitated at 145° C. with a pressure of 790 p.s.i. of hydrogen for 1.5 hours. The catalyst and solvent were removed as previously described and the crude product distilled to yield 9(10)-morpholino-10(9)-hydroxystearylamine which had an amine number of 306 (calculated amine number for $C_{22}H_{46}O_2N_2$ is 303).

EXAMPLE VI

9(10)-(β-Aminoethyl)-Amino-10(9)-Hydroxystearonitrile

To 688 g. of 9,10-epoxystearonitrile (4.65% oxirane oxygen) in a flask was added 600 g. of ethylene diamine and 148 g. of n-butanol. The mixture was then reacted at 122° C. for 18 hours.

A 93% yield based on weight yield of amine fraction and oxirane content of 9,10-epoxystearonitrile of 9(10)-(β - aminoethyl) - amino - 10(9) - hydroxystearonitrile was obtained which after being purified as described in Example I had an amine number of 317 (calculated amine number for $C_{20}H_{41}ON_3$ is 330).

9(10)-(β-Aminoethyl)-Amino-10(9)-Hydroxystearylamine 200 g. of the above prepared 9(10)-(β-aminoethyl)-amino-10(9)-hydroxystearonitrile was charged into an autoclave with 200 g. of methanol, 17 g. of ammonia and 10 g. of Raney nickel. The mixture was then agitated at 150° C. under a pressure of 450 p.s.i. of hydrogen for 4 hours. The catalyst and solvent were then removed as previously described, and the crude product was distilled to yield 9(10)-(β-aminoethyl)-amino-10(9)-hydroxystearylamine with an amine number of 487 (calculated amine number for $C_{20}H_{45}ON_3$ is 490).

EXAMPLE VII

9(10)-Diethanolamino-10(9)-Hydroxystearonitrile

To 800 g. of 9,10-epoxystearonitrile (4.65% oxirane oxygen) in a flask was added 490 g. of diethanolamine, 100 ml. of the monobutanol ether of diethylene glycol. The mixture was heated at 150° C. for 7 hours.

A 100% yield based on weight yield of amine fraction and oxirane content of crude 9,10-epoxystearonitrile of 9(10) - diethanolamino - 10(9) - hydroxystearonitrile was obtained which after being purified as described in Example I had an amine number of 158 (calculated amine number for $C_{22}H_{44}O_3N_2$ is 146).

9(10)-Diethanolamino-10(9)-Hydroxystearylamine 411 g. of the above prepared 9(10)-diethanolamino-10(9)-hydroxystearonitrile was charged into an autoclave with 20 ml. of methanol, 30 g. of ammonia and 12 g. of wet Raney nickel. The mixture was then agitated at 150° C. with 450–480 p.s.i. of hydrogen for 1.5 hours. The catalyst and solvent were removed as previously described and the crude reaction product distilled to yield 9(10) - diethanolamino - 10(9) - hydroxystearylamine which had an amine number of 290 (calculated amine number for $C_{22}H_{48}O_3N_2$ is 289).

EXAMPLE VIII

9(10)-Meta-Aminomethylbenzylamino-10(9)-Hydroxystearonitrile

To 1043 g. of 9,10-epoxystearonitrile (4.57% oxirane oxygen) in a flask was added 1224 g. of meta-xylylene diamine. The mixture then was heated at 150° C. for 24 hours.

The 9(10) - meta-aminomethylbenzylamino-10(9)-hydroxystearonitrile obtained after being purified and distilled as described in Example I had an amine number of 271 (calculated amine number for $C_{26}H_{45}ON_3$ is 270).

9(10)-Meta-Aminomethylbenzylamino-10(9)-Hydroxystearylamine 200 g. of the above prepared 9(10)-meta-aminomethylbenzylamino - 10(9)-hydroxystearonitrile was charged into an autoclave with 200 ml. of methanol, 24 g. of ammonia and 10 g. of wet Raney nickel. The reaction mixture was agitated at 750 p.s.i.g. of hydrogen for 1.5 hours at 150° C. The resulting 9(10)-meta-aminomethylbenzylamino-10(9)-hydroxystearylamine after distillation had an amine number of 403 (calculated amine number for $C_{26}H_{49}ON_3$ is 401).

EXAMPLE IX

9(10)-Meta-Aminophenylamino-10(9)-Hydroxystearonitrile

To 1052 g. of 9,10-epoxystearonitrile (4.57% oxirane oxygen) in a flask was added 650 g. of meta-phenylene diamine and 175 g. of ethylene glycol. The mixture was then reacted at 150° C. for 11½ hours.

The 9(10) - meta - aminophenylamino-10(9)-hydroxystearonitrile obtained after being purified and distilled as described in Example I had an amine number of 284 (calculated amine number for $C_{24}H_{41}ON_3$ is 290).

9(10)-Meta-Aminophenylamino-10(9)-Hydroxystearylamine 423 g. of the above prepared 9(10)-meta-aminophenylamino-10(9) - hydroxystearonitrile was charged into an autoclave with 120 ml. of methanol, 16 g. of wet Raney nickel and 67 g. of ammonia. The reaction mixture was agitated at 700 p.s.i.g. of hydrogen for about 6 hours at 130–135° C. The catalyst and solvent were removed as previously described and the crude product had an amine number of 399 and contained 14% of the original nitrile (calculated amine number for $C_{24}H_{45}ON_3$ is 430).

To determine the effectiveness of the above-described compounds as inhibitors for corrosion of ferrous metals by water containing hydrogen sulfide, the following tests in which controls were likewise prepared were conducted. Measured amounts of the compounds to be tested were added to one liter flasks, each containing 100 ml. of kerosene. The flasks were filled with deaerated water containing 5% sodium chloride and 500 parts per million of hydrogen sulfide. Tared mild steel 16-gauge coupons, one inch square were suspended on glass hooks and lowered into the water phases in the flasks. The oxygen free flasks were then sealed and stored under static conditions at ambient temperatures for 7 days. The panels were then removed from flasks, dipped in dilute inhibited hydrochloric acid, rubbed to remove scale, then rinsed in distilled water, dried, weighed and compared to the controls.

The testing indicated that all the compounds of Examples I–IX were effective at concentrations of 10 parts per million as based on total liquid present, while the 9(10)-anilino-10(9)-hydroxystearylamine proved to be extremely effective (93% corrosion inhibition) at a concentration of 5 parts per million as based on total liquid present.

It will be readily apparent to those skilled in the art that by varying the amine reactant and/or epoxy nitrile used in preparing the amino-hydroxy nitrile to be hydrogenated, a wide number of hydroxy polyamines may be prepared which do not depart from the spirit and scope of the present invention.

The embodiments of the invention in which an exclusive property or privilege is claimed are defined as follows:

1. A hydroxy polyamine having the formula $RCH_2NH_2$ in which R is an aliphatic hydrocarbon group containing from 16–22 carbon atoms and has attached to at least one of said carbon atoms an OH group and having adjacent to the OH substituted carbon atom, a carbon atom having attached thereto a

group where $R_1$ and $R_2$ are members selected from the class consisting of (1) hydrogen, (2) alkyl, (3) aryl, (4) hydroxy alkyl, and (5) where

is a heterocyclic ring

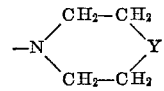

where Y is selected from the group consisting of oxygen, nitrogen, and sulfur.

2. 9-amino-10-hydroxystearylamine.
3. 10-amino-9-hydroxystearylamine.
4. 9-dimethylamine-10-hydroxystearylamine.
5. 10-dimethylamino-9-hydroxystearylamine.
6. 9-dodecylamino-10-hydroxystearylamine.
7. 10-dodecylamino-9-hydroxystearylamine.
8. 9-anilino-10-hydroxystearylamine.
9. 10-anilino-9-hydroxystearylamine.
10. 9-morpholino-10-hydroxystearylamine.
11. 10-morpholino-9-hydroxystearylamine.
12. 9-β-aminoethylamino-10-hydroxystearylamine.
13. 10-β-aminoethylamino-9-hydroxystearylamine.
14. 9-diethanolamino-10-hydroxystearylamine.
15. 10-diethanolamino-9-hydroxystearylamine.
16. 9 - meta - aminomethylbenzylamino - 10 - hydroxystearylamine.
17. 10 - meta - aminomethylbenzylamino - 9 - hydroxystearylamine.
18. 9 - meta - aminophenylamino - 10 - hydroxystearylamine.
19. 10 - meta - aminophenylamino - 9 - hydroxystearylamine.

References Cited in the file of this patent
UNITED STATES PATENTS 2,941,004    Pinson et al. _____ June 14, 1960

FOREIGN PATENTS 984,218    France _____ Feb. 21, 1951

UNITED STATES PATENT OFFICE
CERTIFICATE OF CORRECTION

Patent No. 3,123,604                                  March 3, 1964

Edgar R. Rogier

It is hereby certified that error appears in the above numbered patent requiring correction and that the said Letters Patent should read as corrected below.

Column 3, line 28, after "reaction" insert -- product --; line 45, for "-hydroxystearoamine" read -- -hydroxystearylamine --; column 4, line 14, for "9(10)", second occurrence, read -- 10(9) --; column 6, line 42, for "9-dimethylamine-" read -- 9-dimethylamino- --.

Signed and sealed this 14th day of July 1964.

(SEAL)

Attest:

ESTON G. JOHNSON                                    EDWARD J. BRENNER
Attesting Officer                                         Commissioner of Patents

UNITED STATES PATENT OFFICE

CERTIFICATE OF CORRECTION

Patent No. 3,123,604                               March 3, 1964

Edgar R. Rogier

It is hereby certified that error appears in the above numbered patent requiring correction and that the said Letters Patent should read as corrected below.

Column 3, line 28, after "reaction" insert -- product --; line 45, for "-hydroxystearoamine" read -- -hydroxystearylamine --; column 4, line 14, for "9(10)", second occurrence, read -- 10(9) --; column 6, line 42, for "9-dimethylamine-" read -- 9-dimethylamino- --.

Signed and sealed this 14th day of July 1964.

(SEAL)

Attest:

ESTON G. JOHNSON                                   EDWARD J. BRENNER
Attesting Officer                                       Commissioner of Patents